United States Patent [19]

Schmidt et al.

[11] 4,101,512
[45] Jul. 18, 1978

[54] DISPERSION OF ANTIOXIDANT IN CROSS-LINKABLE POLYETHYLENE

[75] Inventors: Gertraud A. Schmidt, Long Branch; Louis A. Bopp, Fair Haven, both of N.J.

[73] Assignee: General Cable Corporation, Greenwich, Conn.

[21] Appl. No.: 716,688

[22] Filed: Aug. 23, 1976

[51] Int. Cl.² .............................................. C08K 3/24
[52] U.S. Cl. .................... 260/45.95 C; 174/110 PM; 260/45.7 R; 260/45.9 R; 260/45.95 R; 260/45.85 B; 264/340; 427/212
[58] Field of Search ................. 260/45.95 C, 45.85 B, 260/45.7 R, 45.9 R, 45.95 R; 526/57, 30; 264/340; 427/212

[56] References Cited

U.S. PATENT DOCUMENTS

| 2,528,523 | 11/1950 | Kent ........................................ 526/57 |
| 2,826,570 | 3/1958 | Ivett ........................................ 526/57 |
| 3,432,459 | 3/1969 | Listner ................................ 260/45.75 |
| 3,432,462 | 3/1969 | Gignilliat et al. .............. 260/45.85 S |
| 3,455,752 | 7/1969 | Gray et al. ........................... 264/236 |

OTHER PUBLICATIONS

Wire and Wire Products, Jul. 1965, pp. 976–980, and 1021.
Wire and Wire Products, May 1963, pp. 670, 675–678, 724 and 725.
Wire and Wire Products, Apr. 1961, pp. 465–468, 516, 517 and 518.

Primary Examiner—V. P. Hoke
Attorney, Agent, or Firm—Roy C. Hopgood; John M. Calimafde; Charles W. Neill

[57] ABSTRACT

This invention is an improved method for dispersing antioxidant material in cross-linkable insulation for electric cables. The antioxidant, which has a high melting point, is dissolved in a carrier, preferably the cross-linking agent, to obtain a solution of low melting point that is dispersed through the pellets of insulation when the ingredients are mixed in a blender. Improvements in the blender cycle reduce the content of fines, improve dispersion of the antioxidant and shorten the blending cycle. The preferred ingredients used are 4,4'-thiobis (6 tert-butyl-m-cresol) as the antioxidant and dicumyl peroxide as the cross-linking agent.

8 Claims, 1 Drawing Figure

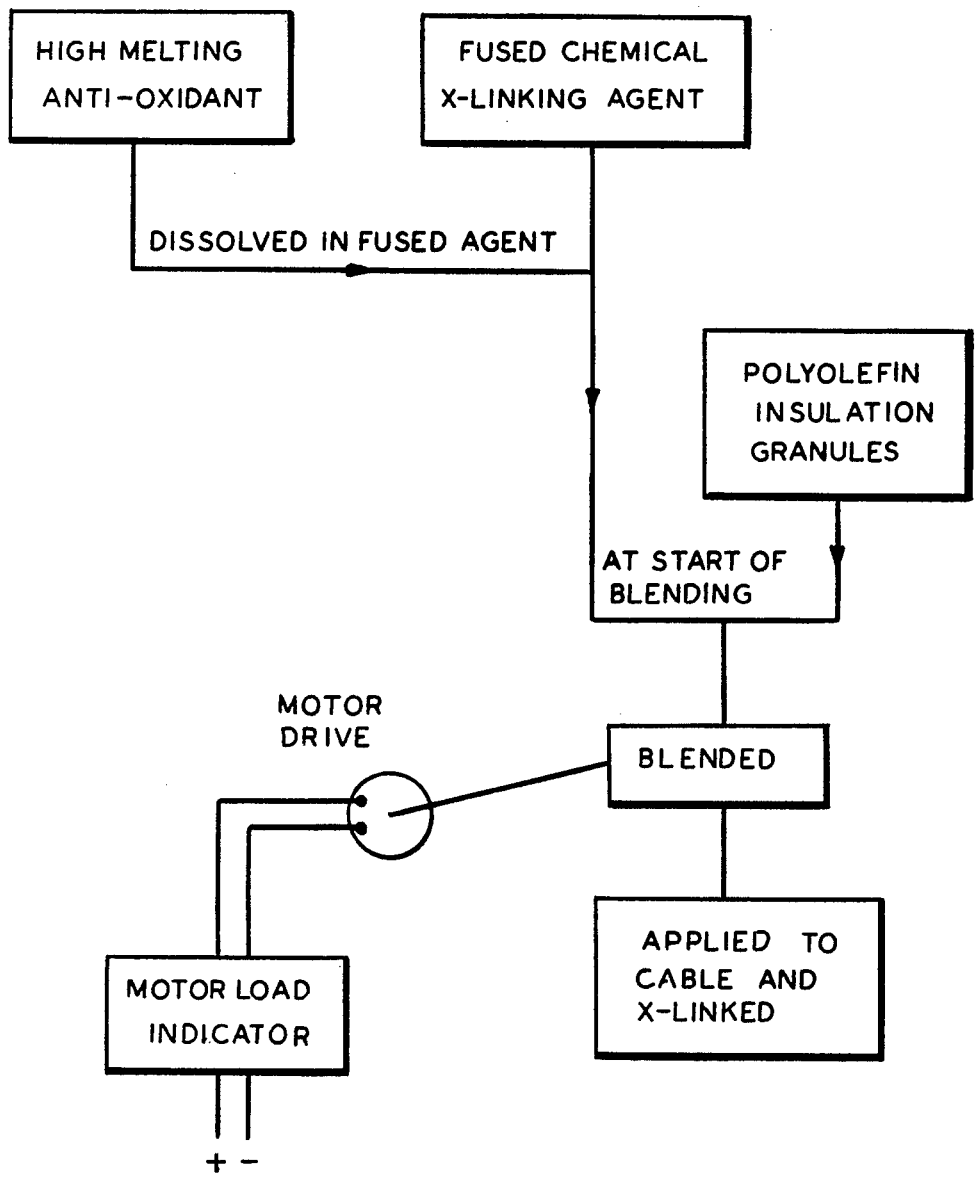

DISPERSION OF ANTIOXIDANT IN CROSS-LINKABLE POLYETHYLENE

BACKGROUND AND SUMMARY OF INVENTION

In the manufacture of products based upon polyolefins, it is essential to include suitable additives to inhibit oxidation and prolong the life expectancy of the material. The effectiveness of the antioxidant is, of course, dependent upon the chemical characteristics that it possesses, some types being more effective than others with any given polymer system. The amount used will also influence effectiveness. Of particular significance, however, is the degree of dispersion obtained in the polymer system. For any antioxidant in any given amount, the true effectiveness is directly related to the dispersion achieved. A number of side effects, independent of the basic function of oxygen attack inhibition, are caused by poor dispersion of the antioxidant incorporated. These include, but are not limited to poorer mechanical properties such as reduced tensile and tear strength, reduced resistance to low temperature flexing and lower elongation. Electrically, poor dispersion can vastly reduce breakdown voltage strength of the polyolefin dielectric, and can contribute to electrical losses by increasing power factor and dielectric constant.

There are numerous ways practiced commercially to incorporate antioxidant materials into polymer systems. Method 1. The antioxidant can be added during manufacture of the raw polymer which, while possibly achieving reasonably good dispersion, limits the amount and type incorporated to one entity. Method 2. The most common approach is utilization of high shear mixers. The latter system requires subjecting the base polymer to high shear forces at substantially elevated temperatures for relatively long periods of time. Often due to the very high melting points of most antioxidants, the material being dispersed does not melt and therefore can easily form agglomerates of particles of itself or with other components in a mixed composition. Once agglomerates are formed, it is unlikely that they are broken down completely by the shear forces that are available in the mixing operation. The heat history during high temperature, high shear mixing uses up some of the antioxidant and causes undesired gelled polymer particles to form. Additionally, the high shear forces involved reduces the molecular weight of the polymer system.

The third technique, Method 3, having the advantage of eliminating the high shear forces and most of the heat history associated with conventional mixing operations, is described in U.S. Pat. No. 3,455,752. In this method, the base polymer is polyethylene with or without fillers and other modifying ingredients which is introduced in pellet form at room temperature into a ribbon blender or similar type of mixer having a stirring or tumbling action, and a peroxide type of curing agent is incorporated by diffusion through the pellet wall. This operation is carried out usually with the mixing chamber walls heated but to a temperature below the softening point of the pelleted base material. The highest temperatures in this system to which the polymer is subjected is, therefore, some temperature lower than the temperature of the mixer, but substantially below the softening point of the composition. The peroxide used has a melting point of about 20° to 25° C above room temperature and becomes liquified as batch temperature increases. In this system, antioxidants in very minor amounts, such as 0.1 parts per 100 parts of polyethylene pellets, are introduced at the start of the mixing cycle and are randomly scattered throughout the pellet mass. Some antioxidant particles adhere to the pellets via the static charge which builds on the pellet surfaces due to collision of the pellets; however, the dispersion achieved is very arbitrary and totally nonuniform, some of the pellets not receiving any antioxidant coating at all. Subsequent peroxide addition which later coats the particles uniformly partially conveys the antioxidant particles into the pellets, again randomly and completely nonuniformly. A further drawback of this process is that during the time interval required to agitate the polyethylene pellets and develop the surface charge to adhere antioxidant particles, the friction between pellets abrades the surface generating an excessive amount of polyethylene dust, commonly termed "fines," which is detrimental in later processing of the polyethylene into cable insulation.

In our invention, we have found a method to improve the degree of dispersion of nonmeltable (at processing temperatures) antioxidants to a state wherein all agglomeration associated with conventional processes described above is completely eliminated. Additionally, in the case of polyethylene mixing described in Method 3 above, all of the desirable features of the process such as manufacture directly from pellets, reduction of heat history and loss of antioxidant associated with the higher temperature mixing such as in Methods 1 and 2, is retained while at the same time, generation of fines is virtually eliminated also.

Other objects, features and advantages of the invention will appear or be pointed out as the description proceeds.

BRIEF DESCRIPTION OF DRAWING

The drawing is a flow diagram illustrating the preferred sequence of operations of the invention.

DESCRIPTION OF PREFERRED EMBODIMENT

In the preferred embodiment of the invention, the insulation used is a chemically cross-linkable polyethylene with dicumyl peroxide as the cross-linking agent and Santonox R as the antioxidant. Santonox R is a tradename of Monsanto Company of Akron, Ohio. The material is 4,4'-thiobis(6 tert-butyl-m-cresol). In this description, the trade name will be used.

Santonox has a melting point of about 160° C, which is well above the temperature used for blending in Method 3, previously referred to. Dicumyl peroxide has a melting point of about 39° C. By dissolving Santonox in molten dicumyl peroxide in a ratio of about 0.2 to 2.0, respectively, the resultant physical mixture has a melting point approximately that of the dicumyl peroxide. The ratio of about 0.2 to 2.0 is typical of the proportions used per hundred parts of polyethylene insulation in unfilled natural cross-linkable compounds.

The solution of antioxidant in the cross-linking agent is blended with granules or pellets of polyethylene or other polyolefin insulating material in a blender, preferably a ribbon blender.

The blender is preferably preheated to a temperature of approximately 80° C before adding any of the ingredients to the blender. We have found that it is unnecessary to preheat the insulation granules before placing them in the blender.

We have also found that it is advantageous to add the Santonox-dicumyl peroxide solution to the blender at the start of the blender operation. The granules are thus lubricated quickly, and the amount of fines in the mixed product is reduced.

The former practice of mixing the granules together by tumbling them for a period prior to introducing the antioxidant and cross-linking agent was largely responsible for the forming of fines in the insulation. Introducing the antioxidant and cross-linking agent at the start of the blending cycle has the additional advantage that it shortens the total cycle.

At the start of the blending cycle, the current draw on the motor will be at the relatively highest level that will occur during the entire cycle. The current load will diminish due to the lubricating action of the dicumuyl peroxide antioxidant blend and will remain at that level until these materials have been absorbed by the polyethylene pellets. This end point of the blending cycle is indicated by an increase in the current draw.

Determination of the completion of the blending cycle may also be based on the appearance of the granules in the blender. For example, the mixture changes from an oily to a dry appearance and becomes more free-flowing as the blending operation approaches completion.

By way of example, a batch may be compounded as follows:

|  | Pounds per Batch | % |
|---|---|---|
| Polyethylene | 200.00 | 97.89 |
| Antioxidant Santonox R | 0.30 | 0.15 |
| Curing Agent (Dicumyl peroxide) | 4.00 | 1.96 |

While we have generalized materials to which the invention can be applied as polyolefin, and specifically polyethylene, it is adaptable to any and all polymerics which are peroxide curable and which invariabley contain an antioxidant. In practice, however, the invention is intended primarily for the incorporation of antioxidant and peroxide using a ribbon blender for the particular mixing method; that is, by absorption through the surface of a pellet in a tumble-mix type of operation as opposed to a mill or Banbury mixing operation where the base polymer is caused to be fluxed by heat and shearing and additives are physically interspersed into the fluxed polymer system. Besides polyethylene, ethylene-vinyl acetate copolymers, ethylene-ethylacrylate copolymers, ethylene propylene copolymers, EPM (ethylene-propylene rubber type copolymer), EPDM (Ethylene-propylene rubber type terpolymer) and blends of any or all of these can be employed in conjunction with this invention. It should be recognized that while our efforts were directed specifically to an unfilled polyethylene based composition, the method has been employed successfully on filled compositions containing either nonblack or carbon black fillers. Examples are the emission shield compound (U.S. Pat. No. 3,885,085) and semi-conducting compounds used as conductor and insulation shielding.

Santonox has been described as the preferred antioxidant, but other antioxidants can be used. For example, Irganox 1010, which is manufactured by Ciba-Geigy Corporation of Ardsley, New York. The Irganox cimpound is generically tetrakis [methylene3-(3′,5′-di-t-butyl-4′ hydroxyphenyl)propionate]. Another example of an antioxidant is Irganox 1035, which is also made by the Ciba-Geigy Corporation, and is generically thiodiethylene bis-(3,5-di-tert-butyl-4 hydroxy)hydrocinnamate.

The preferred cross-linking agent is dicumyl peroxide and preferably that sold under the trade name Di-Cup R, manufactured by the Hercules Company. Other cross-linking agents are Vulcup R, also manufactured by the Hercules Company, and which is generically a,a′-bis(t-butyl peroxy)diisopropylbenzene. Another suitable cross-linking agent is Varox, manufactured by R. T. Vanderbilt Company of New York, N.Y. Varox is generically 2,5-bis(tert-butyl peroxy)-2,5 dimethylhexane. Other peroxides which may be employed are described in U.S. Pat. No. 2,888,424, column 5.

The advantage of having uniformly dispersed antioxidant is reflected in the aging characteristics of the finished product. There are no localized areas starved of antioxidant which can fail due to polymer oxidation long before the bulk of the material becomes oxidized as the antioxidant is gradually depleted during service life. Other advantages of the full degree of dispersion are manifested in improved dielectric breakdown voltage and in reducing the tendency toward the development of electrical trees.

The proportion of antioxidant and cross-linking agent used in the insulation is not critical. Satisfactory results can be obtained where the ingredients are compounded by weight according to the following proportions:

| Base Polymer system | 100 |
|---|---|
| Antioxidant | 0.05 – 5.0 |
| Cross-linking agent | 0.10 – 5.0 |
| Proportion of antioxidant to the cross-linking agent should be between | 1:1 and 1.100 respectively |
| Any suitable ratio wherein the resultant melting point is below 80C in the antioxidant/peroxide solution. | |

These proportions are for presently available materials used in the cable industry. Proportions are given by way of example, and some aspects of the invention, such as the dispersion by a solution of the axtioxidant in the cross-linking agent, are not dependent upon proportions as more concentrated products may become available.

The preferred embodiment of the invention has been illustrated and described, but changes and modifications can be made and some features can be used in different combinations without departing from the invention as defined in the claims.

What is claimed is:

1. The method of dispersion of an antioxidant, that has a melting point higher than the softening point of pellets of an electric cable polyolefin insulation into which a quantity of the antioxidant must be dispensed, which method comprises dissolving the antioxidant in a fused cross-linking agent which must be dispensed throughout the insulation for subsequent cross-linking of the polyolefin, said cross-linking agent having a substantially lower melting point than the antioxidant and the solution having a melting point substantially lower than the softening point of the pellets of insulation, dissolving the antioxidant, while in solid phase, in the cross-linking agent before bringing either of the ingredients of the solution into contact with the pellets of insulation, using an antioxidant and cross-linking agent that make a solution which is absorbed into the pellets to distribute the antioxidant and cross-linking agent into the pellets of the polyolefin, adding the solution, in the molten condition to the pellets of the polyolefin and tumbling the pellets and solution in a ribbon blender, at temperatures above the melting point of the solution but below the softening temperatures of the pellets, until the solution is uniformly distributed over the surfaces of the pellets, and continuing the tumbling in the ribbon blender until the uniformly distributed solution is absorbed by the pellets through the surfaces thereof and throughout the mass of each of the polyolefin pellets.

2. The method described in claim 1 characterized by mixing the antioxidant and a carrier to form the solution having a melting point approaching that of the carrier.

3. The method described in claim 1 characterized by using dicumyl peroxide as the carrier.

4. The method described in claim 1 characterized by using 4,4'-thiobis(6 tert-butyl-m-cresol) as the antioxidant.

5. The method described in claim 1 characterized by placing pellets of polyethylene in the blender with the pellets at substantially room temperature, adding the solution to the pellets at substantially the start of the operation of the blender in order to reduce fines and to shorten the blending cycle.

6. The method described in claim 1 characterized by driving the blender with an electric motor that draws its relatively highest level of current at the start of the blending cycle, continuing the operation of the blender as the current load diminishes due to the lubricating action of the cross-linking agent antioxidant blend, and terminating the blending cycle when the current drawn by the motor begins to increase and indicates that the lubricating action is ceasing because of the absorption of the blend materials by the polyethylene and resulting additional load on the blender.

7. The method described in claim 1 characterized by using as the antioxidant a material from the group consisting of 4,4'-thiobis(6 tert-butyl-m-cresol), tetrakis[methylene 3-(3',5'-di-t-butyl-4' hydroxypyenyl)propionate]methane and thiodiethylene bis-(3,5-di-tert-butyl-4 hydroxy)hydrocinnamate.

8. The method described in claim 1 characterized by the carrier being a cross-linking agent for the insulating material and from the group consisting of dicumyl peroxide, a,a'-bis(t-butyl peroxy)diisopropylbenzene and 2,5-bis(tert-butyl peroxy)-2,5 dimethylhexane.

* * * * *